United States Patent
Oltmann et al.

(10) Patent No.: US 11,945,470 B2
(45) Date of Patent: Apr. 2, 2024

(54) METHOD FOR CONTROLLING THE MOVEMENT OF A VEHICLE AND DEVICE FOR CARRYING OUT THE METHOD

(71) Applicant: DAIMLER AG, Stuttgart (DE)

(72) Inventors: Volker Oltmann, Calw (DE); Alexander May, Calw (DE); Helmut Schittenhelm, Stuttgart (DE); Nikolai Tochtermann, Leonberg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 739 days.

(21) Appl. No.: 17/058,767

(22) PCT Filed: May 9, 2019

(86) PCT No.: PCT/EP2019/061960
§ 371 (c)(1),
(2) Date: Nov. 25, 2020

(87) PCT Pub. No.: WO2019/228776
PCT Pub. Date: Dec. 5, 2019

(65) Prior Publication Data
US 2021/0197864 A1 Jul. 1, 2021

(30) Foreign Application Priority Data
May 30, 2018 (DE) ...................... 10 2018 004 303.8

(51) Int. Cl.
*B60W 50/029* (2012.01)
*B60W 10/18* (2012.01)
(Continued)

(52) U.S. Cl.
CPC ........ *B60W 60/0018* (2020.02); *B60W 10/18* (2013.01); *B60W 50/0205* (2013.01);
(Continued)

(58) Field of Classification Search
CPC ............. B60W 60/0018; B60W 10/18; B60W 50/0205; B60W 50/04; B60W 60/0053;
(Continued)

(56) References Cited

U.S. PATENT DOCUMENTS 9,428,184 B2 * 8/2016 Kikuchi .............. B60W 30/025
9,523,984 B1 * 12/2016 Herbach ............... B60W 10/18
(Continued)

FOREIGN PATENT DOCUMENTS

CN 102371980 A 3/2012
CN 105246733 A 1/2016
(Continued)

OTHER PUBLICATIONS

Examination Report created on Jan. 18, 2019 in related/corresponding DE Application No. 10 2018 004 303.8.
(Continued)

*Primary Examiner* — Masud Ahmed
(74) *Attorney, Agent, or Firm* — PATENT PORTFOLIO BUILDERS PLLC (57) ABSTRACT

A method for controlling the movement of a vehicle in an automatic driving operation involves, during the automatic driving operation, the vehicle capable of being operated both in a regular operating mode and in an emergency operating mode. When a functional impairment of the regular operating mode is established, a switch from the regular operating mode to the emergency operating mode is carried out. In the emergency operating mode, the vehicle is guided automatically to an emergency stop position. In the emergency operating mode, the vehicle is braked with a deceleration profile which contains three deceleration phases, namely a first deceleration phase with a momentary strong braking, a second deceleration phase with a somewhat longer moderate braking, and a third deceleration phase with a strong braking (Continued)

lasting until the vehicle has come to a standstill or until the vehicle driver of the vehicle takes over a vehicle guidance of the vehicle.

16 Claims, 3 Drawing Sheets

(51) Int. Cl.
  *B60W 50/02* (2012.01)
  *B60W 50/04* (2006.01)
  *B60W 60/00* (2020.01)

(52) U.S. Cl.
  CPC ........ *B60W 50/04* (2013.01); *B60W 60/0053* (2020.02); *B60W 2720/106* (2013.01)

(58) Field of Classification Search
  CPC ....... B60W 2720/106; B60W 60/0015; B60W 60/007; B60W 50/02; B60W 10/184; B60W 30/08; B60W 50/16
  See application file for complete search history.

(56) References Cited

U.S. PATENT DOCUMENTS

| | | | | |
|---|---|---|---|---|
| 9,550,500 | B2 * | 1/2017 | Hackenberg | B60W 60/0057 |
| 9,663,104 | B2 * | 5/2017 | Hauler | B60W 60/00186 |
| 11,136,021 | B1 * | 10/2021 | Funke | B62D 7/159 |
| 2013/0024075 | A1 * | 1/2013 | Zagorski | B60W 30/0956 701/1 |
| 2016/0132054 | A1 * | 5/2016 | Eigel | B60W 30/18 701/23 |
| 2020/0023859 | A1 * | 1/2020 | Schmitt | B60W 10/18 |

FOREIGN PATENT DOCUMENTS

| | | |
|---|---|---|
| CN | 105358396 A | 2/2016 |
| CN | 107107919 A | 8/2017 |
| CN | 107921934 A | 4/2018 |
| DE | 102008056204 A1 | 5/2010 |
| DE | 102013213171 A1 | 1/2015 |
| DE | 102013219887 A1 | 4/2015 |
| DE | 102015003124 A1 | 9/2016 |
| DE | 102016209993 A1 | 12/2017 |
| DE | 102016221581 A1 | 5/2018 |
| DE | 102017011808 A1 | 6/2019 |
| EP | 1468887 A1 | 10/2004 |
| EP | 2314490 A1 | 4/2011 |
| EP | 3300974 A1 | 4/2018 |
| JP | 2007320474 A | 12/2007 |

OTHER PUBLICATIONS

International Search Report dated Aug. 1, 2019 in related/corresponding International Application No. PCT/EP2019/061960.
Written Opinion dated Aug. 1, 2019 in related/corresponding International Application No. PCT/EP2019/061960.
Office Action dated Feb. 18, 2023 in related/corresponding CN Application No. 201980035692.4.
Office Action dated Aug. 21, 2023 in related/corresponding CN Application No. 201980035692.4.

* cited by examiner

METHOD FOR CONTROLLING THE MOVEMENT OF A VEHICLE AND DEVICE FOR CARRYING OUT THE METHOD

BACKGROUND AND SUMMARY OF THE INVENTION

Exemplary embodiments of the invention relate to a method for controlling the movement of a vehicle and a device for carrying out the method.

DE 10 2013 213 171 A1 discloses a method and a device for operating a motor vehicle in an automatic driving operation. In the method, a standard trajectory is ascertained, which implements vehicle guidance according to the target setting predetermined by the driver and the current vehicle surroundings situation, and a safety trajectory is ascertained, which implements a safe stopping of the vehicle in case of an emergency depending on the current vehicle surroundings situation. Furthermore, in the method, the standard trajectory is supplied to a first control device, by means of which the signals can be forwarded to actuator devices of the vehicle to guide the vehicle based on the standard trajectory, and the safety trajectory is supplied to a second control device, by means of which signals can be forwarded to actuator devices of the vehicle to guide the vehicle based on the safety trajectory. In the standard operation, the actuator devices are controlled for guiding the vehicle using the first control device and, when safety is a concern and the automatic driving operation cannot be guaranteed, the actuator devices are controlled by the second control device in order to stop the vehicle without danger.

In DE 10 2015 003 124 A1 by the applicant, the full content of which is incorporated here by reference, a method and a device for operating a vehicle in an automatic driving operation are described. During a normal function of the automatic driving operation, an emergency target trajectory is continuously ascertained and stored, which is to be taken as a basis after the occurrence of at least one predetermined error event of an automatic trajectory controller of the vehicle. When a detection of the occurrence of the at least one predetermined error event has taken place, an emergency operating mode is activated, in which the automatic trajectory controller of the vehicle is introduced and, according to the emergency target trajectory stored before the occurrence of the at least one predetermined error event is carried out for a predetermined period of time and/or until the vehicle has stopped, if and as long as a vehicle guidance takeover is carried out by a vehicle driver of the vehicle.

In the not yet published DE 10 2017 011 808.6 by the applicant (published as DE 10 2017 011 808), the full content of which is incorporated here by reference, a method for controlling the movement of a vehicle in an automatic, in particular highly automatic, driving operation and a device for carrying out the method are described. In the method, the automatic driving operation is switched from a regular operating mode, in which the vehicle is automatically guided along a regular target trajectory to a predetermined target position by means of a main control device, to an emergency operating mode, in which the vehicle is automatically guided along an emergency operation target trajectory to an emergency stop position by means of an additional control device, when a functional impairment of the main control device is established. In the regular operating mode, the regular target trajectory, the emergency operation target trajectory, and the ascertained lane course of a driving lane driven along by the vehicle are ascertained in a coordinate system, fixed to the vehicle, of the additional control device. In the emergency operating mode, based on the lane course stored in the additional control device and the lane course determined by the additional control device, an angle error between the coordinate system of the main control device and the additional control device is ascertained, and its influence on the control carried out by the additional control device is compensated for.

DE 10 2016 221 581 A1 discloses a control device for partial or complete automatic guiding of a vehicle, which, with functional vehicle components, guides the vehicle based on a regular controller model and maneuvers the vehicle in the event of a functional vehicle component based on an outage controller model into a predetermined safe state.

DE 10 2013 219 887 A1 discloses a driver assistance system for automatically controlling a vehicle, which, in certain situations, emits a takeover prompt to a vehicle driver in the form of abrupt vehicle deceleration.

DE 10 2008 056 204 A1 discloses a collision avoidance system for vehicles which, when recognizing the danger of a collision, carries out a moderate braking procedure in a first step and carries out a stronger braking procedure in comparison to the moderate braking procedure in a second step.

Exemplary embodiments of the invention are directed to an improved method over the prior art for controlling the movement of a vehicle and a device for carrying out the method.

In a method for controlling the movement of a vehicle in an automatic, in particular highly automatic or automated, driving operation, the vehicle can be operated during the automatic driving operation in a regular operating mode or in an emergency operating mode. In the regular operating mode, the vehicle is guided automatically to a predetermined target position. Preferably, this is carried out by means of a main control device along a regular target trajectory leading to the target position. If, in the regular operating mode, a functional impairment is ascertained, in particular a functional impairment of the preferably used main control device, a switching from the regular operating mode to the emergency operating mode is undertaken. In the emergency operating mode, the vehicle is automatically guided to an emergency stop position. This is preferably carried out by means of an additional control device along an emergency operation target trajectory leading to the emergency stop position. The functionality of the emergency operating mode is also referred to as the regression path function.

Advantageously, the regular target trajectory and the emergency operation target trajectory are continuously determined in the regular operating mode, in particular by means of the preferably used main control device. As a result of the continuous re-determination of the emergency operation target trajectory, the emergency stop position constituting the end of the emergency operation target trajectory is re-determined. The emergency operation target trajectory continuously determined in the regular operating mode is supplied to the additional control device and stored there. The emergency operation target trajectory provided to the additional control device is thus continuously updated during the regular operating mode. It is switched from the regular operating mode to the emergency operating mode when a functional impairment of the main control device is ascertained.

Target trajectory and/or emergency operation target trajectory are not only to be understood, for example, as a locus curve with x,y coordinate points, but rather, along with the x,y coordinate points of a locus curve, along which the vehicle is to be moved, they also contain, for example, information about a dynamic system of the vehicle along the locus curve, i.e., a speed and/or acceleration profile which is to be achieved when driving off.

According to the invention, the vehicle is decelerated in the emergency operating mode with a deceleration profile that contains three deceleration phases that are referred to below as the first, second, and third deceleration phase. In the first deceleration phase, a momentary strong braking is carried out, in particular as a haptic warning which constitutes, in particular, a takeover request. It is particularly advantageous to design the first deceleration phase in such a way that the deceleration increases in a pulsed manner up to a maximum deceleration, referred to below as the first deceleration level, and then decreases to a second deceleration level. The amount of the first deceleration level preferably ranges from 3 $m/s^2$ to 9 $m/s^2$, advantageously is 5 $m/s^2$. The deceleration increase is preferably carried out with a gradient, the amount of which lies between 5 $m/s^3$ and 30 $m/s^3$ and is preferably 15 $m/s^3$. The deceleration decrease is preferably carried out with the same gradient amount as the deceleration increase or with a gradient amount lying between 5 $m/s^3$ and 100 $m/s^3$.

The braking during the first deceleration phase is formed, in particular, as a braking peak, i.e., as a deceleration impulse, and serves, in particular, as haptic feedback to a vehicle driver of the vehicle. This deceleration impulse signals to the vehicle driver that it is not a usual braking of the automatic driving operation in the regular operating mode. Thus, they are motivated to turn their attention towards the driving. This braking impulse also has the advantage that, in the event of an outage of the on-board power supply of a main on-board power supply of the vehicle, which leads to the functional impairment, for example to switching off, of the main control device and additionally leads to the switching off of optical and/or acoustic takeover request prompts, for example, it is also further present as an haptic urgent takeover request.

The amount of the second deceleration level preferably ranges from 1.5 $m/s^2$ to 6 $m/s^2$, wherein the value is chosen in such a way that it is a predetermined amount, preferably at least 1.5 $m/s^2$ below the first deceleration level. An advantageous value for the second deceleration level is 3 $m/s^2$, for example.

On achieving the second deceleration level, the second deceleration phase is introduced. In the second deceleration phase, a somewhat longer ongoing moderate braking is carried out on the second deceleration level, i.e., this braking lasts longer and is weaker than the braking in the first deceleration phase. This second deceleration phase with its moderate braking serves in particular to prepare road users surrounding the vehicle, in particular behind it, for a subsequent braking process. Its duration is, for example, 0.3 s to 3 s.

Thus, in the second deceleration phase, a weak braking is carried out, in particular for a fixedly predetermined period of time. This deceleration makes it possible for the road users behind, even without illuminated brake lights, which are functionless, for example because of the on-board power supply outage, to become aware of the deceleration of the vehicle and to brake themselves. From the point of view of the road users behind, the braking of the vehicle is carried out for no reason since they do not know the technical reason. Thus, it is particularly advantageous to make the road users behind aware of the particular situation with a small deceleration.

In the third deceleration phase following on from the second deceleration phase, a strong braking is carried out which lasts until the vehicle has reached a stop. In general, it is decelerated until the vehicle driver takes over the vehicle guidance of the vehicle or the vehicle has come to a halt. In the third deceleration phase, the deceleration increases from the second deceleration level to a maximum deceleration referred to as the third deceleration level, the amount of which maximum deceleration is a predetermined amount, preferably 1.5 m/s above the second deceleration level. The amount of the third deceleration level is advantageously between 3 $m/s^2$ and 10 $m/s^2$ and is preferably the same as the amount of the first deceleration level. The deceleration increase is preferably carried out with a gradient, the amount of which lies between 1.5 $m/s^3$ and 15 $m/s^3$, and is 5 $m/s^3$ for example.

In this third deceleration phase, the vehicle is thus decelerated in particular with a medium-strong braking until it stops when the vehicle driver does not take over the vehicle guidance in advance. The deceleration is set in particular with a weak braking gradient, i.e., deceleration gradient. Since the potentially present road users behind are then braking or have at least realized that the vehicle is braking, they will adjust their deceleration to that of the vehicle in emergency operating mode.

By means of the solution according to the invention, in every situation, for example even in the event of an outage of the on-board power supply of the main on-board power supply, the vehicle driver understands that they have to take over the vehicle guidance. Additional redundant optical or acoustic warning devices can be dispensed with. The safe vehicle state of the standstill is achieved as quickly as possible without endangering road users behind and alarming vehicle occupants of the vehicle so severely.

The control of the movement of the vehicle is preferably ended when the vehicle driver takes over the vehicle guidance. In particular, the vehicle driver will take over the vehicle guidance as part of the further braking in the second deceleration phase and, if the vehicle driver has still not yet taken over, as part of the further braking in the third deceleration phase, since these braking processes are carried out for the vehicle driver without an obvious reason based on current traffic occurrences, such that the vehicle driver understands that the regular operating mode of the automatic driving operation is no longer present. If they seize the vehicle guiding in good time, the vehicle is decelerated until it reaches a stop.

When the vehicle driver takes over the guiding of the vehicle and/or when the vehicle driver intervenes, the braking is advantageously ended. To that end, it is recognized, for example, whether the vehicle driver actuates a driving pedal of the vehicle, also referred to as the gas pedal, or themselves actuates a braking of the vehicle, in particular a brake pedal, and/or actuates one or more other input means. Alternatively or additionally, it can be provided that a steering actuation on a steering wheel of the vehicle by the vehicle driver ends the deceleration described above.

The described deceleration profile is, in particular, a minimum deceleration profile in order to safely bring the vehicle to a halt. For example, in situations in which there is a braking situation in front of the vehicle, it can be provided that it is decelerated more greatly than specified above. When approaching the end of a traffic jam, for example, this can occur when a driving lane in which the vehicle is moved is blocked by other stationary road users. The necessary constant deceleration is then advantageously calculated and increased, for example, by a safety factor.

This deceleration is then advantageously used together with the deceleration profile described above, for example in such a way that the resulting deceleration is formed by a formation of a minimum value of two decelerations, in particular by the minimal values, in particular according to amount, of both decelerations being added, such that the shape of the deceleration profile is maintained and the deceleration values can only be correspondingly changed by the addition of the constant deceleration.

The described deceleration of the deceleration profile, with or without the additional constant deceleration, can be encoded, for example depending on the time, or integrated to form a target speed at location points.

According to the invention, it is provided that, after switching from the regular operating mode to the emergency operating mode and before the first deceleration phrase, a prediction phase is carried out in which the vehicle is further guided automatically along the regular target trajectory, in particular by means of the additional control device. This means that a prediction by a continuation of a target driving state of a functioning regular automatic driving operation is carried out as would be carried out in the regular operating mode. The prediction phase thus updates the current target driving state of the regular automatic driving operation of the regular operating mode. Since the regression path function, i.e., the emergency driving mode, contains a profile provided by the regular operating mode and its main control device, in particular the emergency operation target trajectory and, in the design, draws on a profile, in particular the regular target trajectory, that is old by the dead time t_tot, in the prediction phase, the continued control is depicted according to the automatic driving operation in the regular operating mode.

The additional control device, by means of which, in the emergency operating mode, the vehicle is automatically guided along the emergency operation target trajectory to the emergency stop position, is formed, for example, as a driving dynamic regulation control device and/or braking control device, in particular as a control device for an electronic stability program (ESP control device). Such an additional control device is formed, in particular, "Fail Operational[ly]". This means that it also continues to work in the event of error, for example, and thus also remains operative in the event of error. Thus, it has a very high degree of outage safety, such that its functional capability is further ensured even in the event of errors occurring. For example, this is achieved by components and/or functions being designed redundantly. In particular, an electrical energy supply of the additional control device is advantageously not or at least not exclusively carried out via the main on-board power supply, via which the main control device is also supplied with electrical energy, but rather via an additional control device on-board power supply, for example, and/or in a different manner, for example by means of an energy store provided for the additional control device, for example by means of a battery and/or an accumulator and/or a capacitor. Thus, even in the event of an on-board power supply outage impairing the functionality of the main control device, the emergency operating mode is ensured by means of the additional control device.

When predetermining a speed profile instead of the deceleration profile of the main control device in relation to this additional control device, it is advantageous when the braking peak, i.e., the deceleration impulse of the first deceleration phase, is stored directly in this additional control device. If the regression path function and thus the emergency operating mode is activated by this additional control device, firstly the braking peak, i.e., this deceleration impulse, is automatically controlled and then the speed specifications are set. This distribution makes it possible to greatly reduce a communication effort and, in situations in which the braking stated above is not sufficient, to flexibly adjust the braking and/or the speed specifications.

A functional impairment of the main control device is then present, for example, when the main control device has an error function and/or when a surroundings sensor system of the vehicle that delivers necessary surroundings information from the main control device has an error function. The respective error function can be the result of an on-board power supply outage of the main on-board power supply of the vehicle and/or of a different occurrence.

For example, the emergency stop position in the regular operating mode is continuously ascertained as a position that is on an outermost edge of a driving lane or a road, on a hard shoulder or on a drivable region next to the road. Thus, in the emergency operating mode, a movement of the vehicle into a safe region, in particular outside an ongoing traffic situation, is made possible, such that a danger both for the vehicle and its vehicle occupants and for other road users is reduced.

For example, in the emergency operating mode, a localization of the vehicle is carried out in order to ascertain a deviation of the position of the vehicle from the emergency target trajectory. The localization in the transverse direction of the vehicle is here advantageously based on ascertaining a distance between the vehicle and at least one lane marking of a driving lane driven on by the vehicle.

Advantageously, the localization in the transverse direction of the vehicle is carried out by dead reckoning on route portions on which there are no lane markings or on which erroneous detections of the lane markings are to be expected.

The localization in the longitudinal direction of the vehicle is advantageously carried out by dead reckoning.

The regular target trajectory ascertained in the regular operating mode, the emergency operation target trajectory and the lane course, for example, which is also transmitted to the additional control device, for example, are advantageously ascertained by the main control device based on surroundings information that the main control device obtains from a surroundings sensor system.

It can be provided that, in the emergency operating mode, the emergency operation desired trajectory stored in the additional control device is adjusted by the additional control device to changed surroundings conditions if the surroundings sensor system or parts thereof are functional in the emergency operating mode and current surroundings information is provided.

A device according to the invention for carrying out this method is formed and set up, in particular, to carry out this method. In particular, it comprises the main control device, which is provided for continuously ascertaining the regular target trajectory leading to the predetermined target position and the emergency operation target trajectory leading to the emergency stop position, wherein the main control device is set up to take over the driving guidance in the regular operating mode of the device and to guide the vehicle in accordance with the determined regular target trajectory, and the additional control device, which is provided to store the emergency operation target trajectory determined by the main control device, wherein the additional control device is set up to take over the driving guidance in the event of a functional impairment of the main control device and to guide the vehicle in accordance with the emergency operation target trajectory. Furthermore, the additional control device is set up to decelerate the vehicle with the deceleration profile that contains the three deceleration phases described above, the first deceleration phase with the momentary strong braking as haptic warning, the second deceleration phase with the somewhat longer moderate braking and the third deceleration phase with the strong braking that lasts until a standstill is reached or until the vehicle driver of the vehicle takes over the vehicle guidance of the vehicle. The advantages described above result from this.

Advantageously, the device also comprises the surroundings sensor system.

BRIEF DESCRIPTION OF THE DRAWING FIGURES

Exemplary embodiments of the invention are explained in more detail below by means of the drawings.

Here are shown.

Parts corresponding to one another are provided with the same reference numeral in all figures.

DETAILED DESCRIPTION

Figure 1:
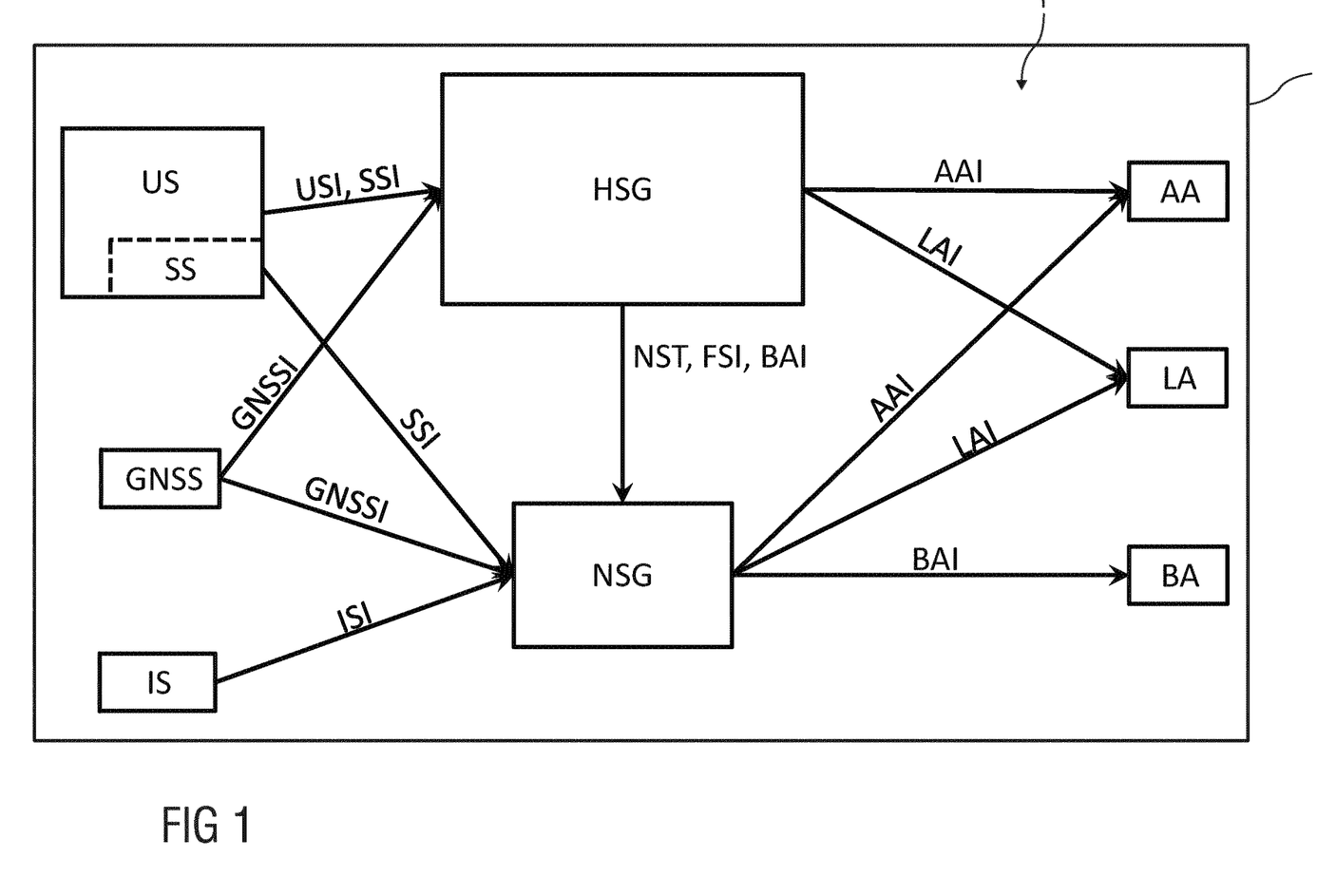
FIG. 1 a block diagram of a device for carrying out a method for controlling the movement of a vehicle in an automatic, in particular highly automatic or autonomous, driving operation, FIG. 2, schematically, a deceleration course over time, FIG. 3, schematically, a detailed section of FIG. 2, FIG. 4, schematically, a speed course over time, and FIG. 5, schematically, a braking path over time.

In a schematic block diagram depiction, FIG. 1 shows a device 1 for controlling the movement of a vehicle 2 in an automatic, in particular highly automatic or autonomous, driving operation, in particular for carrying out a corresponding method for controlling the movement of the vehicle 2 in an automatic, in particular highly automatic or autonomous, driving operation. Such a device 1 and such a method are already described in the not yet published DE 10 2017 011 808.6 by the applicant (published as DE 10 2017 011 808), the full content of which is incorporated here by reference, in particular its description of the figures and figures.

The device 1 comprises, for example, a main control device HSG, an additional control device NSG, a surroundings sensor system US having a lane sensor system SS for recognizing driving lane markings of a driving lane currently driven on by the vehicle 2, a global navigation satellite system or at least one receiving and processing arrangement GNSS for signals of the at least one global navigation satellite system, which forwards corresponding navigation information GNSSI in the manner shown in FIG. 1, an inertial sensor system IS, a drive actuating system AA, a steering actuating system LA and a braking actuating system BA.

The device 1 can be operated in a regular operating mode and in an emergency operating mode. The regular operating mode is the operating mode in which the vehicle 2 is guided in the automatic driving operation to a predetermined target position, taking the surroundings situation into consideration. Route planning to the target position is carried out using the global navigation satellite system, in particular.

The regular operating mode assumes that the automatic driving operation can be implemented safely. When the safe implementation of the automatic driving operation is no longer guaranteed because of an error function of the device 1, the operating mode is switched from the regular operating mode to the emergency operating mode in which the vehicle 2 is automatically guided into an emergency stop position determined in advance.

In the regular operating mode, the main control device HSG receives surroundings information USI from the surroundings sensor system US, in particular information about lane markings SSI and objects protruding into the actual driving lane or are moved into the actual driving lane. Based on the surroundings information USI, SSI received, the main control device HSG continuously plans, i.e., in cyclical time intervals, the movement course of the vehicle 2 within a predetermined prediction horizon. The result of this planning is a target trajectory, subsequently referred to as the regular target trajectory, which specifies a path on which the vehicle 2 is to be automatically guided in the direction of the target position, and which specifies with which speed profile the vehicle 2 is to be moved on this path.

In the regular operating mode, the main control device HSG carries out a trajectory control in such a way that the vehicle 2 is guided in accordance with the specifications of the regular target trajectory. To do so, the main control device HSG generates control commands AAI, LAI, BAI for the drive actuating system AA, steering actuating system LA and braking actuator system BA acting on the longitudinal and transverse dynamics of the vehicle 2. In the example depicted, the drive actuating system AA and the steering actuating system LA are directly controlled by the main control device, while the control of the braking actuating system BA is controlled via the additional control device NSG, which obtains the corresponding control commands BAI from the main control device HSG.

Furthermore, in anticipation of the automatic driving operation having to be ended because of an error function of the main control device HSG, in the regular operating mode, the main control device HSG continuously plans, i.e., in cyclical time intervals, an emergency operation target trajectory NST.

The emergency operation target trajectory NST is planned in such a way that possible hindrances are avoided, and the vehicle 2 is stopped in a safe emergency stop position lying ahead. The emergency operation target trajectory NST states on which path and, for example, with which speed profile the vehicle 2 is to be brought into the safe emergency stop position NP when establishing the error functions.

An error function of the main control device HSG is present, for example, when the main control device HSG itself is no longer operational or when parts of the surroundings sensor system US, which are necessarily required by the main control device HSG for the safe automatic driving operation, are impaired in terms of their function. The ascertained emergency operation target trajectory NST is supplied to the additional control device NSG and stored there. Furthermore, a lane course FSI of the driving lane is detected, for example, by the lane sensor system SS, which is a component of the surroundings sensor system US, by detecting the lane markings, and information about the detected lane course FSI is supplied to the additional control device NSG and saved there.

The additional control device NSG is responsible, for example, for implementing a conventional driving dynamic control based on the initial state of the vehicle 2 detected by the inertial sensor system IS. The inertial sensor system IS here comprises sensors for determining a driving or wheel speed, a transverse acceleration, and a yaw rate of the vehicle 2. Inertial sensor system information ISI is transmitted to the additional control device NSG. The additional control device NSG coordinates the braking requirements of the main control device HSG, i.e., the control commands BAI for the braking actuator system BA, using the braking requirements of the driving dynamic controller. The coordination takes place, in particular, in such a way that the braking requirements of the driving dynamic controller are operated with priority over the braking requirements of the main control device HSG.

When it is established in the regular operating mode that an error function of the main control device HSG is present, such that a safe continuation of the automatic driving operation is no longer ensured, the operating mode of the device 1 is switched from the regular operating mode to the emergency operating mode. In the emergency operating mode, the additional control device NSG assumes the vehicle guiding, i.e., the task of controlling the movement of the vehicle 2.

To do so, the additional control device NSG carries out a trajectory control in such a way that the vehicle 2 is guided into the emergency stop position according to the last valid emergency operation target trajectory NST. The last valid emergency operation target trajectory NST is the last emergency operation target trajectory NST that has been ascertained by the main control device HSG before the occurrence of the error function and has been supplied to the additional control device NSG for storing. The emergency stop position can be a position lying ahead on the actual driving lane, in particular a position on the edge of the driving tack. Yet the emergency stop position can also be a position on an outermost right or outermost left edge of the road or a position on a hard shoulder present on the edge of the road or a position on a drivable region next to the road.

The additional control device NSG, the drive actuating system AA, the steering actuating system LA, and the braking actuating system BA are advantageously designed redundantly, such that the functionality of the device 1 in the emergency operating mode is also ensured in the event of an omission of parts of the device 1, i.e., it is ensured that the additional control device NSG can fulfil its tasks at all times.

For the trajectory control, an actual-target deviation of the vehicle position is advantageously determined and, corresponding to the actual-target deviance determined, control commands AAI, LAI, BAI are generated for the drive actuating system AA, steering actuating system LA and braking actuating system BA, which are adjusted to a minimization of the actual-target deviation. The actual-target deviation is the deviation of the current position of the vehicle 2, called the actual position below, from the emergency operation target trajectory NST.

In the emergency operating mode, the localization of the vehicle 2 necessary for the trajectory control, i.e., the determination of the actual position, is carried out by dead reckoning and, for example, by detecting the driving lane course of the driving lane driven on by the vehicle 2 by means of the lane sensor system SS. Here, the current longitudinal position of the vehicle 2 is determined in the longitudinal direction of the vehicle by the dead reckoning based on a previous position of the vehicle 2. This means that, by means of odometry or comparable methods, the movement of the vehicle 2 is updated, such that it is known at any point in time where the vehicle 2 is. Here, further parameters, for example the position of the vehicle, the curvature and change in curvature of the driving lane etc., can be taken into consideration.

For example, by detecting the lane markings, the lateral position of the vehicle 2 relative to the lane markings, i.e., the transverse position of the vehicle 2 in the driving lane, is determined and thus the transverse position of the vehicle 2 in the transverse direction of the vehicle is determined. The term driving lane is here generally meant as the continuous existence of a driving lane that is in front of the vehicle 2 on the intentional driving route lying ahead.

By knowing the driving lane, there is the advantage that the desired stopping of the emergency operation desired trajectory NST is not exclusively carried out by dead reckoning based on driving dynamic parameters describing the inertial state of the vehicle 2 such as acceleration, speed and yaw rate, but rather the lane course determined online of the driving lane can also be used to adhere to the emergency operation target trajectory NST. The lane sensor system SS used for the lane detection can comprise a camera and/or a Lidar sensor. Possible camera systems are, for example, a forward-looking camera for CMS systems (CMS=Collision Mitigation System) or also cameras for parking assistance systems. The only requirement is that the lane sensor system SS be functionally available to the additional control device NSG in the emergency operating mode.

The basic principle that underlies the device 1 and the method to be carried out by it is thus that two operating modes are provided for controlling the vehicle 2 in the automatic, in particular highly automatic or autonomous, driving operation. The first operating mode is a regular operating mode for the normal automatic driving operation, in which the main control device HSG has the main responsibility for the automatic driving guidance, and the vehicle 2 is automatically guided along the regular target trajectory to the predetermined target position. The second operating mode is the emergency operating mode in which the vehicle 2 is guided by means of the additional control device NSG, for example by means of an ESP control device, according to the emergency operation target trajectory NSG, to the emergency stop position and is braked until it reaches a standstill if the main control device HSG can no longer fulfil its tasks because of an error function, for example outage of the main control device HSG, a main on-board power supply and/or the sensor system and if the vehicle driver themselves does not take over the driving guidance. In the regular operating mode, the emergency operation target trajectory is determined in anticipation of the event of a switch into the emergency operating mode and is provided to the additional control device NSG. This functionality is referred to as regression path function.

Figure 2:
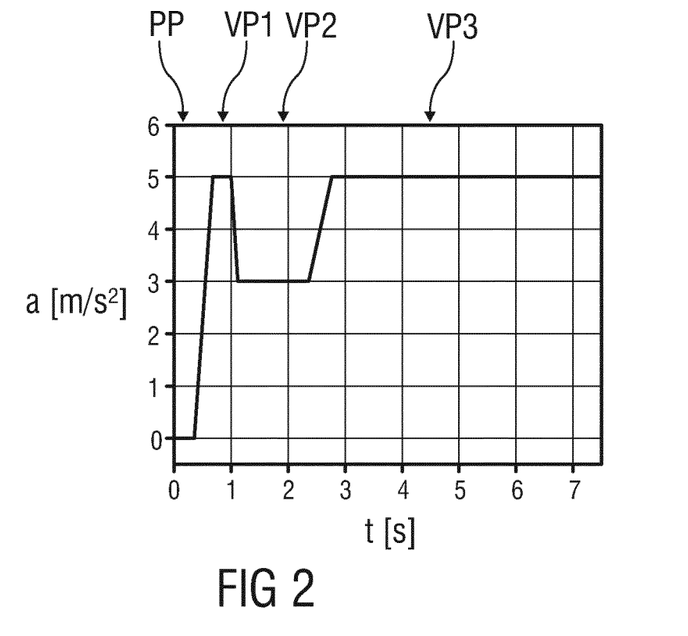

In this method and this device 1, it is furthermore provided that, in the emergency operating mode, the vehicle 2 is decelerated with a deceleration profile containing three deceleration phases VP1, VP2, VP3, as is depicted in FIG. 2 by deceleration a over time t. Here, the deceleration a is a negative acceleration.

In the first deceleration phase VP1, depicted in an enlarged manner in FIG. 2, a momentary strong braking is carried out, in particular as a haptic warning, which constitutes, in particular, a takeover request. This braking is carried out, for example, with an amount of the deceleration gradient of 15 m/s$^3$ and with a maximum deceleration amount of 5 m/s$^2$. This maximum deceleration amount is referred to below as first deceleration level. This means that an increase of the deceleration a with the deceleration gradient of 15 m/s$^3$ is carried out until the first deceleration level of 5 m/s$^2$ is achieved, for example, and this first deceleration level is still maintained for a predetermined period of time of 0.3 s, for example. After this, a decrease of the deceleration a is carried out, as shown in FIG. 2.

This braking is thus formed as a braking peak, i.e., as a deceleration impulse, and serves in particular as haptic feedback to a vehicle driver of the vehicle 2. Thus, this deceleration impulse signals to the vehicle driver is not a usual braking of the automatic driving operation in the regular operating mode. Thus, they are motivated to turn their attention to the driving situation. This braking impulse also has the advantage that it is also furthermore present as a haptic urgent takeover request in the event of an outage of the on-board power supply of the main on-board power supply of the vehicle 2, which leads to the functional impairment, for example to switching off, of the main control device HSG and also to switching off optical and/or acoustic takeover request indications, for example.

In the second deceleration phase VP2, a somewhat longer moderate braking is carried out with a deceleration corresponding to a second deceleration level, i.e., this braking lasts longer than the braking in the first deceleration phase VP1 and has a smaller amount of deceleration in comparison to the first deceleration level. This second deceleration phase VP2 with its braking serves in particular to prepare the road users surrounding the vehicle, in particular those behind it, for a subsequent braking process. The braking in this second deceleration phase VP2 is carried out, for example, with a deceleration of 3 m/s² and over a period of time of two seconds, for example, advantageously including a braking surge. For example, as shown in FIG. 2, the deceleration a is reduced from the first deceleration level of 5 m/s², for example, from the first deceleration phase VP1 to the second deceleration level of 3 m/s² and then maintained for the predetermined period of time of two seconds, for example, during the second deceleration phase VP2.

In the second deceleration phase VP2, a weak braking is thus carried out, in particular for a fixedly predetermined period of time. This deceleration a makes it possible for the road users behind to become aware of the deceleration a of the vehicle 2, even without illuminated brake lights, which are functionless, for example as a result of the on-board power supply outage of the main on-board power supply, and for them to brake themselves. From the point of view of the road users behind, the braking of the vehicle has no reason, since they do not know the technical reason. Thus, it is particularly advantageous to make the road users behind aware of the particular situation with a small deceleration a.

In the third deceleration phase VP3, a strong braking is carried out that lasts until the vehicle 2 has reached a standstill and the vehicle driver takes over the vehicle guidance of the vehicle 2. This braking in the third deceleration phase VP3 has an amount of the deceleration value, referred to below as the third deceleration level. The third deceleration level is above the second deceleration level and is advantageously the same as the first deceleration level. This braking in the third deceleration phase VP3 is carried out, for example, with a flat deceleration gradient of 5 m/s³, for example, and a maximum deceleration of 5 m/s². This means that the deceleration a increases starting from the second deceleration level from the second deceleration phase VP2 with the deceleration gradient of −5 m/s³, for example, to the third deceleration level of 5 m/s², for example, and is held until a standstill at this level, provided that the vehicle driver does not intervene in advance and takes over the driving guidance.

In this third deceleration phase VP3, the vehicle 2 is thus decelerated, in particular with a medium-strong braking until it comes to a standstill, when the vehicle driver does not take over the vehicle guidance in advance. The deceleration a is set, in particular with a weak braking gradient, i.e., deceleration gradient. Since the potentially present road users behind then already brake or have at least realized that the vehicle 2 is braking, they can adapt their deceleration a to the vehicle 2 in the emergency operating mode.

As can be seen in FIG. 2, the deceleration a is not introduced immediately, but rather the first deceleration phase VP1 precedes a prediction phase PP. This prediction phase PP is carried out after switching from the regular operating mode to the emergency operating mode and before the first deceleration phase VP1.

In the prediction phase PP, the vehicle 2 is guided further automatically along the regular target trajectory, in particular by means of the additional control device NSG. This means that a prediction is carried out with a continuation of a target vehicle state of a functioning regular automatic driving mode, as would be carried out in the regular operating mode. The prediction phase PP thus updates the current target driving state of the regular automatic driving operation of the regular operating mode. Since the regression path function, i.e., the emergency operating mode, obtains a profile provided by the first regular operating mode and its main control device HSG, in particular the emergency operation target trajectory NST, and, in the implementation, draws upon a profile that is old by the dead time, in particular the regular target trajectory, the continued control, in the prediction phase PP, is produced according to the automatic driving operation in the regular operating mode.

Thus, in the embodiment depicted in FIG. 2, the deceleration profile has the prediction phase PP and three deceleration phases VP1, VP2, VP3.

Figure 3:
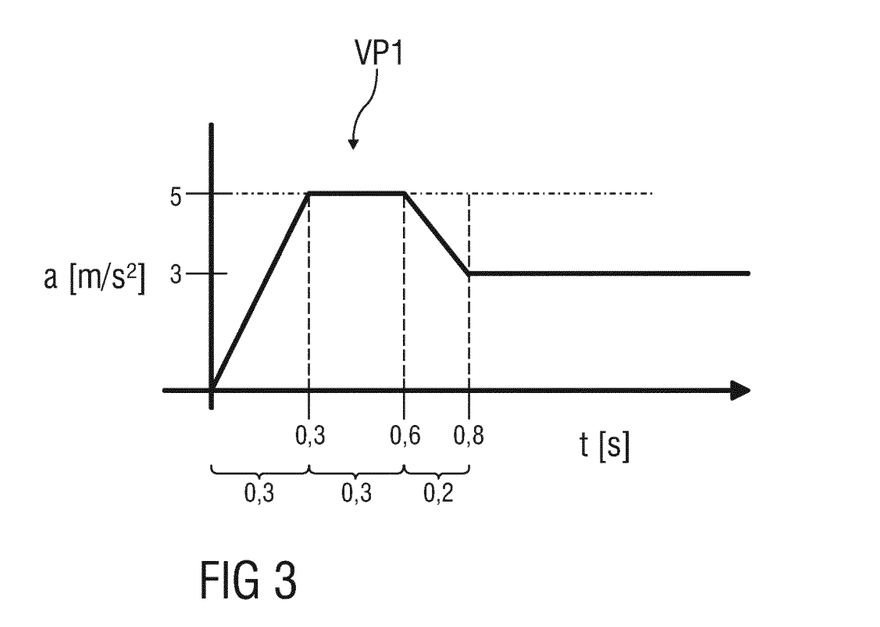
Figure 4:
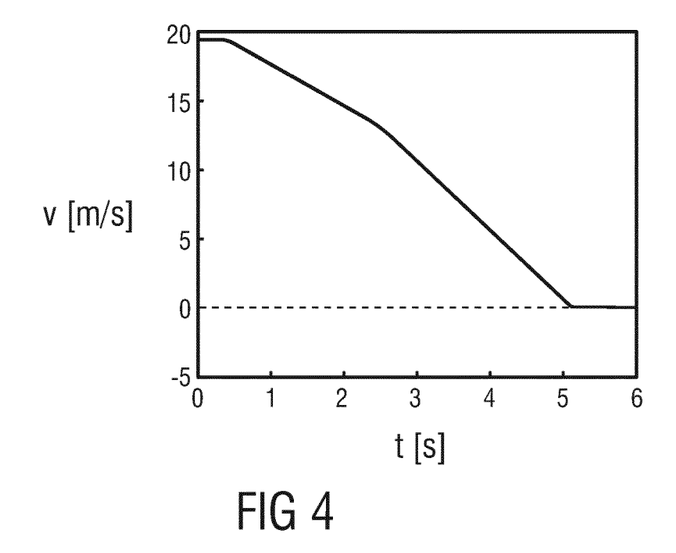
Figure 5:
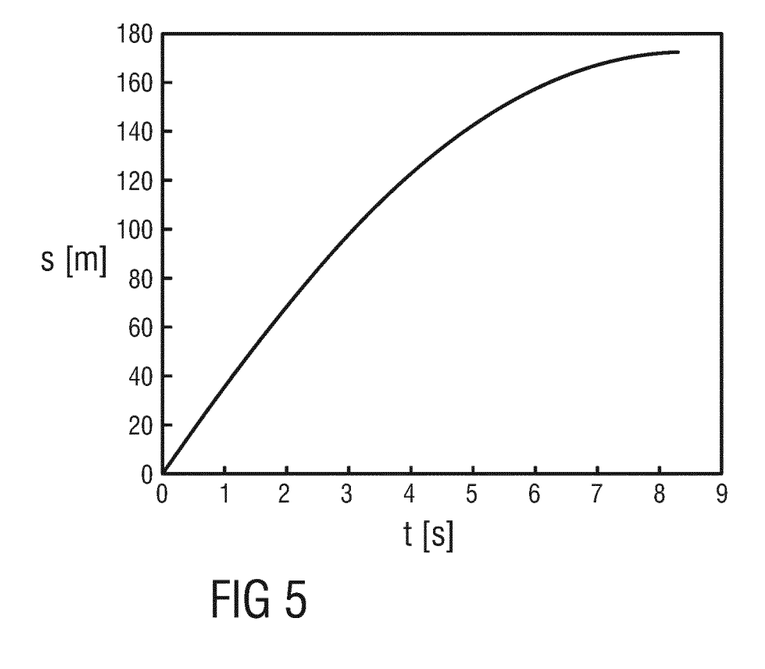

FIG. 3 shows a course of a speed v of the vehicle 2 over time t, and FIG. 4 shows a course of a braking path s of the vehicle 2 over time t from 130 km/h, which is the result of this process.

The control of the movement of the vehicle 2 is ended, in particular, when the vehicle driver takes over the vehicle guidance. In particular, the vehicle driver will take over the vehicle guidance as part of the further braking in the second deceleration phase VP2 and, if the vehicle driver still has not taken over, as part of the further braking in the third deceleration phase VP3, since these braking procedures are carried out for the vehicle driver without an obvious reason based on a current traffic situation, such that the vehicle driver recognizes that the regular operating mode of the automatic driving operation is no longer present. If they do not seize the driving guidance in good time, the vehicle 2 is braked until it reaches a standstill.

When the vehicle driver takes over the vehicle guidance and/or in the event of an intervention by the vehicle driver, the braking is advantageously ended. In addition, it is recognized, for example, whether the vehicle driver actuates a driving pedal, also referred to as the gas pedal, of the vehicle 2 or actuates a brake of the vehicle 2 themselves, in particular a braking pedal, and/or actuates another different input means. Alternatively or additionally, it can be provided that a steering actuation on a steering wheel of the vehicle 2 by the vehicle driver ends the deceleration a described above.

The described deceleration profile is, in particular, a minimum deceleration profile, in order to safely transfer the vehicle 2 to a halt. For example, in situations in which there is a braking situation in front of the vehicle, it can be provided that it is decelerated more strongly than specified above. This can occur, for example, when approaching the tail end of a traffic jam, when the driving lane on which the vehicle 2 is moved is blocked in front of the vehicle by other stationary road users. The required constant deceleration is then advantageously calculated and increased by a safety factor, for example. This constant deceleration is then advantageously used together with the deceleration profile specified above, for example in such a way that the resulting deceleration is formed by forming a maximum value of the two decelerations.

With a formation, appropriate to the amount, of the resulting deceleration from two deceleration profiles, then at any point in time (or location point), select the maximum value of the individual decelerations at the corresponding point in time (location point).

The described deceleration of the deceleration profile, with or without the additional constant deceleration, can be encoded depending on the time t, for example, or integrated to form a target speed at location points.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for controlling the movement of a vehicle in an automatic driving operation, the method comprising:
during the automatic driving operation
guiding the vehicle automatically along a regular target trajectory to a predetermined target position in a regular operating mode;
determining a functional impairment of the regular operating mode; and
guiding the vehicle, responsive to the determination of a functional impairment of the regular operating mode, automatically to an emergency stop position in an emergency operating mode,
wherein, in the emergency operating mode
the vehicle is initially guided further automatically along the regular target trajectory in a prediction phase and the vehicle is then braked with a deceleration profile containing first, second, and third deceleration phases, wherein
the first deceleration phase involves braking for a first period of time within a first deceleration range,
the second deceleration phase involves braking for a second period of time within a second deceleration range, and
the third deceleration phase involves a braking for a third period of time within a deceleration range until the vehicle has come to a standstill or until a driver of the vehicle takes over guidance of the vehicle,
a maximum value of the first deceleration range is greater than a maximum value of the second deceleration range,
the maximum value of the second deceleration range is less than a maximum value of the third deceleration range,
a minimum value of the second and third deceleration ranges is greater than zero.

2. The method of claim 1, wherein
the vehicle is guided automatically along the regular target trajectory to the predetermined target position in the regular operating mode by a main control device,
the vehicle is guided automatically along an emergency operation target trajectory to the emergency stop position in the emergency operating mode by an additional control device,
in the regular operating mode, the regular target trajectory and the emergency operation target trajectory are continuously determined,
the emergency operation target trajectory is supplied to the additional control device and stored in the additional control device, and
the vehicle is switched from the regular operating mode to the emergency operating mode when a functional impairment of the main control device is determined.

3. The method of claim 1, wherein the braking in the first deceleration phase is carried out with a deceleration gradient having an amount between 5 m/s$^3$ and 30 m/s$^3$, or is carried out with a maximum deceleration having an amount between 3 m/s$^2$ and 9 m/s$^2$.

4. The method of claim 1, wherein the braking in the second deceleration phase is carried out with a deceleration having an amount between 1.5 m/s$^2$ and 9 m/s$^2$, or the braking in the second deceleration phase is carried out over a period of time of 0.3 s to 3 s.

5. The method of claim 1, wherein in the emergency operating mode, the vehicle is guided automatically along an emergency operation target trajectory to the emergency stop position by an additional control device that is a driving dynamic regulation control device or braking control device.

6. The method of claim 2, wherein a functional impairment of the main control device is present when the main control device has an error function or when a surroundings sensor system of the vehicle, which delivers surroundings information from the main control device, has an error function.

7. The method of claim 1, wherein in the regular operating mode, the emergency stop position is determined continuously as a position which is on an outermost edge of a driving lane or a road, on a hard shoulder or on a drivable region next to the road.

8. The method of claim 1, wherein, in the emergency operating mode the method further comprises:
localizing the vehicle by dead reckoning; and
guiding the vehicle to the emergency stop position using an emergency operation target trajectory that uses the localizing of the vehicle.

9. The method of claim 8, wherein, in the emergency operating mode the method further comprising:
detecting lane markings on a road on which the vehicle is traveling, wherein the guiding the vehicle to the emergency stop position also uses the detected lane markings.

10. The method of claim 1, wherein in the prediction phase
a current target driving state of the automatic driving operation in the regular operating mode is updated, and
the vehicle is controlled according to the updated current target driving state of the automatic driving operation in the regular operating mode.

11. The method of claim 1, wherein the maximum value of the first and third deceleration ranges are equal.

12. The method of claim 1, wherein the maximum value of the first and third deceleration ranges are different.

13. A device for controlling the movement of a vehicle in an automatic driving operation, the device comprising:
a main control device that continuously determines a regular target trajectory leading to a predetermined target position and an emergency operation target trajectory leading to an emergency stop position, wherein the main control device is configured to take over vehicle guidance in a regular operating mode of the device and to guide the vehicle in accordance with the determined regular target trajectory; and
an additional control device that stores the emergency operation target trajectory determined by the main control device, wherein the additional control device is configured to take over the driving guidance when a functional impairment of the main control device occurs and to guide the vehicle in accordance with the emergency operation target trajectory, and wherein the additional control device is furthermore configured to first further guide the vehicle in a prediction phase automatically along the regular target trajectory and then to brake with a deceleration profile, which contains first, second, and third, deceleration phases, wherein
the first deceleration phase involves braking for a first period of time within a first deceleration range,
the second deceleration phase involves braking for a second period of time within a second deceleration range, and
the third deceleration phase involves a braking for a third period of time within a deceleration range until the vehicle has come to a standstill or until a driver of the vehicle takes over guidance of the vehicle,
a maximum value of the first deceleration range is greater than a maximum value of the second deceleration range,
the maximum value of the second deceleration range is less than a maximum value of the third deceleration range,
a minimum value of the second and third deceleration ranges is greater than zero.

14. The device of claim 13, wherein the maximum value of the first and third deceleration ranges are different.

15. A method for controlling the movement of a vehicle in an automatic driving operation, the method comprising:
during the automatic driving operation
guiding the vehicle automatically along a regular target trajectory to a predetermined target position in a regular operating mode;
determining a functional impairment of the regular operating mode; and
guiding the vehicle, responsive to the determination of a functional impairment of the regular operating mode, automatically to an emergency stop position in an emergency operating mode,
wherein, in the emergency operating mode
the vehicle is initially guided further automatically along the regular target trajectory in a prediction phase and the vehicle is then braked with a deceleration profile containing first, second, and third deceleration phases, wherein
the first deceleration phase involves a momentary strong braking,
the second deceleration phase involves a longer braking than the first deceleration phase having less force than the first deceleration phase, and
the third deceleration phase involves a braking that has more force than the second deceleration phase and the braking lasts until the vehicle has come to a standstill or until a driver of the vehicle takes over guidance of the vehicle, wherein
in the first deceleration phase is carried out with a deceleration gradient having an amount between 5 $m/s^3$ and 30 $m/s^3$, or is carried out with a maximum deceleration having an amount between 3 $m/s^2$ and 9 $m/s^2$,
in the second deceleration phase is carried out with a deceleration having an amount between 1.5 $m/s^2$ and 9 $m/s^2$, or the braking in the second deceleration phase is carried out over a period of time of 0.3 s to 3 s, and the braking in the third deceleration phase is carried out with a deceleration gradient having amount between 1.5 $m/s^3$ and 10 $m/s^3$, or is carried out with a maximum deceleration having an amount between 3 $m/s^2$ and 10 $m/s^2$.

16. The device of claim 13, wherein the maximum value of the first and third deceleration ranges are equal.

* * * * *